United States Patent [19]

Bentley et al.

[11] Patent Number: 4,849,460
[45] Date of Patent: Jul. 18, 1989

[54] PROCESS FOR PREPARING POLYUREA AND POLYUREA/POLYURETHANE POLYMERS FROM POLYMERIC POLYAMINE

[75] Inventors: James M. Bentley, Tervuren; James P. Brown, Sterrebeek; Guy Frijns, Rixensart; David J. Sparrow, Tervuren, all of Belgium

[73] Assignee: Imperial Chemical Industries PLC, London, England

[21] Appl. No.: 27,955

[22] Filed: Mar. 19, 1987

[30] Foreign Application Priority Data

Mar. 26, 1986 [GB] United Kingdom ............... 8607597
Jun. 17, 1986 [GB] United Kingdom ............... 8608313

[51] Int. Cl.$^4$ ............................................. C08G 18/14
[52] U.S. Cl. ................................ 521/163; 528/68; 528/76; 528/77
[58] Field of Search ..................... 528/68, 76, 77; 521/157, 137, 163

[56] References Cited

U.S. PATENT DOCUMENTS

| | | | |
|---|---|---|---|
| 3,306,875 | 2/1967 | Hay | 528/215 |
| 3,799,986 | 3/1974 | Poppelsdorf | 564/491 |
| 3,806,456 | 4/1974 | Vogel | 526/87 |
| 4,433,067 | 2/1984 | Rice et al. | 521/51 |
| 4,448,904 | 5/1984 | Dominguez | 521/160 |
| 4,513,133 | 4/1985 | Dominquez | 528/49 |
| 4,530,941 | 7/1985 | Turner et al. | 521/176 |
| 4,585,850 | 4/1986 | Dominguez | 528/122 |
| 4,607,090 | 8/1986 | Dominguez | 528/48 |
| 4,631,298 | 12/1986 | Presswood | 521/163 |
| 4,751,255 | 6/1988 | Bentley et al. | 521/163 |

FOREIGN PATENT DOCUMENTS

A2360119 6/1975 Fed. Rep. of Germany .
A2292753 11/1975 France .

OTHER PUBLICATIONS

Encyclopedia of Polymer Science & Technology, vol. 6, pp. 164–165.
Encyclopedia of Polymer Science & Tech., vol. 15, pp. 459–460.

Primary Examiner—John Kight
Assistant Examiner—Dennis R. Daley
Attorney, Agent, or Firm—Cushman, Darby & Cushman

[57] ABSTRACT

The invention relates to a process for producing a polyurea or polyurea/polyurethane compound by reaction of an organic polyisocyanate with a diamine chain extender and an isocyanate-reactive polymer, the latter consisting at least in part, in a polymeric polyamine havng a molecular weight of from 1000 to 16000, containing from 2 to 4 primary amino groups per molecule, and being the condensation product of a polycarboxylic acid or ester with a stoichiometric excess of a polyamine having terminal propoxy groups and a molecular weight of from 500 to 5000.

8 Claims, No Drawings

PROCESS FOR PREPARING POLYUREA AND POLYUREA/POLYURETHANE POLYMERS FROM POLYMERIC POLYAMINE

This invention relates to a process for producing macromolecular materials which contain polyurea linkages.

It is well known to manufacture polyurethane materials of a cellular or non-cellular, flexible or rigid nature by reacting organic polyisocyanates with polymeric polyols in the presence, where required, of other components such as foaming agents, cross-linking agents, catalysts and surfactants.

The rate of reaction between the polyisocyanate and the polyol can be controlled by the use of the aforementioned catalysts which may also serve to regulate the speed of this reaction relative to competing reactions, for example a foaming reaction. In some situations, however, the reactivity of polyols towards polyisocyanates is less than is desirable, especially where the polyol contains secondary hydroxyl groups as is usually the case in polyether polyols derived from propylene oxide.

It is known that isocyanates react more readily with primary amino groups than with hydroxyl groups and, accordingly, it has been proposed to use amino-terminated polymers in a reaction with organic polyisocyanates, to prepare macromolecular materials which contain polyurea linkages and have improved physical and chemical properties compared with the corresponding polyurethanes.

It is also known that amino terminated polymers can obtained by reacting polyoxypropylene polyols with ammonia under such conditions that the 2-hydroxypropoxy end groups are converted to 2-aminopropoxy groups, or by reacting polyether polyols with acrylonitrile thereby introducing cyanoethoxy terminal groups which are converted by hydrogenation to 3-aminopropoxy groups.

It has now been found that primary amino ended polymers obtained by reacting polycarboxylic acids or derivatives thereof with aliphatic polyamines having terminal aminopropoxy groups, are useful in the preparation of polyurea or polyurea/polyurethane polymers.

Accordingly the invention provides a process for producing a polyurea or polyurea/polyurethane product which is either cellular, microcellular or non-cellular by reaction of organic polyisocyanate, diamine chain extender and isocyanate-reactive polymer, optionally in the presence of suitable catalysts, blowing agents, further chain extenders, additives and auxiliaires, which process is characterized by the fact that at least a part of the isocyanate reactive polymer is a polymeric polyamine having a molecular weight of from 1000 to 16000 and containing from 2 to 4 primary amino groups per molecule, said polyamine being the condensation product of a polycarboxylic acid and a stoichiometric excess of a polyamine having terminal aminopropoxy groups and a molecular weight of from 500 to 5000.

The polymeric polyamines used in accordance with the invention may be prepared by condensing one or more polycarboxylic acids or amide-forming derivatives thereof with one or more of the aforesaid polyamines having terminal aminopropoxy groups at temperatures up to 250 deg. Celsius. The molecular weights of the polycarboxylic acid and the polyamine and the amount of excess of polyamine are chosen in known manner to give a polymeric polyamine of the desired molecular weight. For example, polymeric diamines having molecular weights of about 2000 may be obtained by condensing two moles of a diamine of molecular weight 1000 with one mole of adipic acid, or by several other diamine/dicarboxylic acid combinations which will be readily appreciated by a person skilled in the art. Similarly, the overall functionalities of the starting materials may be chosen in known manner to give polymeric polyamine products of the desired functionality.

Polyamines having terminal aminopropoxy groups which may be used in the preparation of the polymeric polyamines include polyamines in which the terminal groups are 3-aminopropoxy groups. Such polyamines may be obtained by cyanoethylating polyols followed by hydrogenation. Polyols which may be cyanoethylated include low molecular weight polyols, for example ethylene glycol, propylene glycol, diethylene glycol, 1,4-butanediol, 1,6-hexanediol, 1,4-cyclohexanedimethanol, 2,5-bis-hydroxymethylfuran, glycerol, trimethylolpropane, 1,2,6-hexanetriol and pentaerythritol residues as well as polyether polyols obtained by reacting such low molecular weight polyols with ethylene oxide and/or propylene oxide. Further polyols which may be cyanoethylated include polyolefin polyols, such as hydroxyterminated butadiene homo- and copolymers, polyacetal polyols, polythioether polyols, polyhydroxylated natural oils, etc. Mixtures of polyols may be used, for example mixtures of polyols of different functionality. In this respect, it will be appreciated that the number of 3-aminopropoxy groups present in the polyamine after cyanoethylation and hydrogenation will correspond with the number of hydroxyl groups present in the starting polyol. Cyanoethylation and hydrogenation may be effected using prior art conditions. Thus, one or more polyols may be reacted with acrylonitrile at temperatures of from -20 to 10 degrees Celsius using 1 to 5, preferably 2 to 3, moles of acrylonitrile per hydroxyl group. After removal of unreacted acrylonitrile, hydrogenation may be carried out under standard conditions, for example using conventional hydrogenation catalysts.

Other polyamines having terminal aminopropoxy groups which may be used in the preparation of the polymeric polyamines include polyamines in which the terminal groups are 2-aminopropoxy groups. Such polyamines may be obtained by aminating polyols having two or more secondary hydroxyl groups. Polyols which may be aminated include dipropylene glycol, tripropylene glycol and other polyoxypropylene polyols. The number of 2-aminopropoxy groups present in the polyamine after termination will correspond with the number of secondary hydroxyl groups present in the polyol.

Polycarboxylic acids and amide-forming derivatives thereof which may be used in the preparation of the polymeric polyamines include aliphatic and aromatic dicarboxylic acids, for example succinic, glutaric, adipic, sebacic, phthalic and terephthalic acids and the di-lower alkyl, especially dimethyl, esters thereof. It is particularly convenient to use a commercially available mixture of the dimethyl esters of succinic, glutaric and adipic acids, for example a mixture in the approximate weight ratio 1:3:1. Other suitable polycarboxylic acids include polyesters having carboxylic acid or carboxylic acid ester end groups. Such polyesters are well known in the art and may be obtained by reacting one or more glycols, for example ethylene glycol, propylene glycol, diethylene glycol, 1,4-butanediol, 1,5-pentanediol or 1,6-hexanediol, cycloaliphatic glycols such as 1,4-cyclohexanedimethanol and 2,5 bis hydroxymethyl furan or araliphatic glycols such as bis hydroxyethoxybenzene with an excess, appropriate to the desired molecular weight, of one or more dicarboxylic acids or their anhydrides or lower alkyl esters. Suitable acids include the aliphatic and aromatic dicarboxylic acids mentioned above. The reaction mixture may also include minor amounts of higher functionality polyols such as glycerol, trimethylolpropane or pentaerythritol in order to produce polyols having more than two carboxylic acid or carboxylic acid ester groups per molecule. The polyesters suitably have molecular weights in the range 250 to 4000.

A further class of suitable polycarboxylic acid derivatives includes polyethers having carboxyalkyl end groups. Such modified polyethers may be obtained by reacting a polyether polyol with an excess of a lower alkyl ester of a lower aliphatic dicarboxylic acid, for example a mixture of the dimethyl esters of succinic, glutaric and adipic acids. The modified polyethers suitably have molecular weights in the range 250 to 6000.

The polymeric polyamines used in accordance with the invention provide polymers with new characteristics as a consequence of their special nature.

According to the invention the polymeric polyamines are reacted, optionally in admixture with polymeric polyols, for example polyether or polyester polyols, with organic polyisocyanates and amine chain extenders to form useful polyurea or polyurea/polyurethane products which may have a cellular or non-cellular structure.

Preferred chain extenders are aromatic diamines, such as in particular 1-methyl-3,5-diethyl-2,4-diaminobenzene, 1-methyl-3,5 diethyl-2,6 diaminobenzene (both of these materials are also called diethyltoluene diamine or DETDA), 1,3,5-triethyl-2,6 diaminobenzene, 3,5,3',5'-tetraethyl-4,4' diaminodiphenylmethane and the like. Particularly preferred aromatic diamine chain extenders are 1-methyl-3,5-diethyl-2,4 diaminibenzene or a mixture of this compound with 1-methyl-3,5-diethyl-2,6 diaminobenzene.

Suitable polyisocyanates for the process of the invention include aromatic diisocyanates, for example tolylene diisocyanate and diphenylmethane diisocyanate which may be used as pure compounds, for example 4,4'-diphenylmethane diisocyanate, or isomer mixtures, for example mixtures of 4,4' and 2,4'-diphenylmethane diisocyanates or as unrefined products, for example products containing diphenylmethane diisocyanate isomers and oligomers (crude MDI).

The reaction between the polyamine and the polyisocyanate with the inclusion, where appropriate, of foaming agents, catalysts, surfactants, further chain-extenders, flame-retardants, fillers, pigments etc. may be performed so as to produce solid elastomers, microcellular elastomers, flexible foams and other useful products. Known polyurethane techniques, for example reaction injection moulding, may be used.

The invention is illustrated but not limited by the following examples:

EXAMPLE 1

Preparation of a polymeric polyamine.

A glass reactor vessel, equipped with a nitrogen sparge, vigreux column and condensor was charged with 2 moles of a polymeric diamine, obtained by cyanoethylating and reducing a polypropylene glycol having a molecular weight of 2000. 1 mole of adipic acid was then added, and catalyst was added to a concentration of 6 ppm.

The reaction mixture was heated to 230 Deg. C for 8 hours during which time methanol was collected at the condensor. At the end of this time the product was cooled and discharged from the reactor.

The obtained product had an average molecular weight of 3030 g/mole.

EXAMPLE 2

Preparation of a polyurea polymer product.

Under a dry nitrogen atmosphere a solution of 30.3 grams of the product obtained in example 1, in 303 grams of dimethyl formamide, was charged to a 500 cc round bottomed reaction kettle, equipped with a thermocouple, $N_2$ inlet/outlet, stirrer and dropping funnel (250 cc). This solution was slowly agitated and maintained at a temperature of 45 Deg. C, using an electric heating mantle. A solution of 3.085 grams of a MDI composition sold by Imperial Chemical Industries Ltd. under the trade name Suprasec VM-20 (Suprasec is a registered Trade Mark) in 30.85 grams of dimethyl formamide was charged under $N_2$ to the dropping funnel.

The addition of the MDI solution was made over a period of 1.5 hours, under a $N_2$ blanket and with constant stirring, while maintaining a reaction temperature of 58 Deg. C. Heat was removed from the reaction vessel 1 hour after the addition of the last of the MDI-solution. The thus obtained 10 % polymer solution was allowed to cool to room temperature The polymer was precipitated from solution by pouring a thin stream of the polymer solution into a large excess of water, at room temperature. The water is decanted and the precipitate is dried.

The average molecular weight of the obtained product is determined by NMR analysis. As noted previously, one can prepare polyurea polymer products using as a chain extender aromatic diamines such as 1-methyl-3, 5-diethyl-2, 4-diaminobenzene, 1-methyl-3, 5-diethyl-2,6 diaminobenzene (both of these materials are also called diethyltoluene diamine or DETDA), 1,3,5-triethyl-2,6-diaminobenzene, 3,5,3',5'-tetraethyl-4,4'-diaminodiphenylmethane and the like.

We claim:

1. A process for producing a polyurea or polyurea/polyurethane product which is either cellular, microcellular or non-cellular, by the reaction of organic polyisocyanate, diamine chain extender and isocyanate reactive polymer, with or without suitable catalysts, blowing agents, additives and auxiliaries, characterised in that at least part of the isocyanate reactive polymer is a polymeric polyamine having a molecular weight of from 1000 to 16000, as determined by nuclear magnetic resonance, and containing from 2 to 4 primary amino groups per molecule, said polymeric polyamine being the condensation product of a polycarboxylic acid and a stoichiometric excess of a polyamine having terminal aminopropoxy groups and a molecular weight of from 500 to 5000.

2. A process according to claim 1 wherein the polymeric polyamine results from the condensation with a polyamine having terminal aminopropoxy groups being the hydrogenation product of a cyanoethylated polyol.

3. A process according to claim 1 wherein the polymeric polyamine results from the condensation with a polyamine having terminal aminopropoxy groups obtained by the amination of a polyol having two or more secondary hydroxyl groups.

4. A process according to any one of claims 1-3 wherein the polymeric polyamine results from the condensation of a polyamine with a polycarboxylic acid selected from succinic acid, glutaric acid, adipic acid or a mixture of two or more of said acids.

5. A process according to any one of claims 1-3 wherein the polymeric polyamine results from the condensation of a polyamine with a mixture of the dimethyl esters of succinic, glutaric and adipic acids in the approximate weight ratio of 1:3:1.

6. A process according to any one of claims 1-3 wherein the diamine chain extender is an aromatic diamine.

7. A process according to claim 4 wherein the diamine chain extender is an aromatic diamine.

8. A process according to claim 5 wherein the diamine chain extender is an aromatic diamine.

* * * * *